US011559919B2

United States Patent
Liard et al.

(10) Patent No.: US 11,559,919 B2
(45) Date of Patent: Jan. 24, 2023

(54) METHOD FOR THE APPLICATION OF MINERAL BINDER COMPOSITIONS CONTAINING FIBRES

(71) Applicant: SIKA TECHNOLOGY AG, Baar (CH)

(72) Inventors: Maxime Liard, Zürich (CH); Raphael Bourquin, Neerach (CH); Didier Lootens, Küssnacht (CH)

(73) Assignee: SIKA TECHNOLOGY AG, Baar (CH)

( * ) Notice: Subject to any disclaimer, the term of this patent is extended or adjusted under 35 U.S.C. 154(b) by 509 days.

(21) Appl. No.: 16/630,079

(22) PCT Filed: Aug. 8, 2018

(86) PCT No.: PCT/EP2018/071452
§ 371 (c)(1),
(2) Date: Jan. 10, 2020

(87) PCT Pub. No.: WO2019/030256
PCT Pub. Date: Feb. 14, 2019

(65) Prior Publication Data
US 2020/0148594 A1 May 14, 2020

(30) Foreign Application Priority Data
Aug. 9, 2017 (EP) .................................... 17185657

(51) Int. Cl.
*B28C 5/40* (2006.01)
*B33Y 10/00* (2015.01)
(Continued)

(52) U.S. Cl.
CPC .......... *B28C 5/406* (2013.01); *B01F 27/1121* (2022.01); *B01F 27/1143* (2022.01);
(Continued)

(58) Field of Classification Search
None
See application file for complete search history.

(56) References Cited

U.S. PATENT DOCUMENTS

| 4,778,276 A | 10/1988 | Meyer et al. | |
| 2018/0126636 A1* | 5/2018 | Jang | B33Y 40/00 |
| 2019/0105622 A1* | 4/2019 | Lewis | B01F 33/30 |

FOREIGN PATENT DOCUMENTS

| CN | 203357623 U | 12/2013 |
| CN | 204869242 U | 12/2015 |

(Continued)

OTHER PUBLICATIONS

Feb. 11, 2020 International Preliminary Report on Patentability issued in International Patent Application No. PCT/EP2018/071452.
(Continued)

*Primary Examiner* — Yung-Sheng M Tsui
(74) *Attorney, Agent, or Firm* — Oliff PLC

(57) ABSTRACT

A method for the application of hydrous mineral binder compositions which contain fibres. An aqueous accelerator is mixed with the aqueous binder composition in a mixer shortly before the application. The method is very robust and makes it possible to quickly produce even large moulded bodies having a uniform surface and very good strength development properties.

13 Claims, 1 Drawing Sheet

(51) Int. Cl.

| | | |
|---|---|---|
| B33Y 70/10 | (2020.01) | |
| B28B 1/00 | (2006.01) | |
| B28C 5/12 | (2006.01) | |
| C04B 14/48 | (2006.01) | |
| C04B 16/06 | (2006.01) | |
| C04B 22/14 | (2006.01) | |
| C04B 28/02 | (2006.01) | |
| C04B 40/00 | (2006.01) | |
| B01F 27/60 | (2022.01) | |
| B01F 27/70 | (2022.01) | |
| B01F 27/72 | (2022.01) | |
| B01F 27/1121 | (2022.01) | |
| B01F 27/1143 | (2022.01) | |
| B01F 27/192 | (2022.01) | |
| C04B 103/14 | (2006.01) | |
| C04B 111/00 | (2006.01) | |
| B01F 101/28 | (2022.01) | |

(52) U.S. Cl.
CPC .......... *B01F 27/1921* (2022.01); *B01F 27/62* (2022.01); *B01F 27/70* (2022.01); *B01F 27/72* (2022.01); *B28B 1/001* (2013.01); *B28C 5/1292* (2013.01); *B33Y 10/00* (2014.12); *B33Y 70/10* (2020.01); *C04B 14/48* (2013.01); *C04B 16/0641* (2013.01); *C04B 22/148* (2013.01); *C04B 28/02* (2013.01); *C04B 40/0046* (2013.01); *B01F 2101/28* (2022.01); *C04B 2103/14* (2013.01); *C04B 2111/00181* (2013.01)

(56) References Cited

FOREIGN PATENT DOCUMENTS

| CN | 106007587 A | 10/2016 |
|---|---|---|
| CN | 106988535 A | 7/2017 |
| DE | 32 13 349 A1 | 1/1983 |
| EP | 0 035 281 A2 | 9/1981 |
| GB | 2 098 497 A | 11/1982 |
| WO | 2013/064826 A1 | 5/2013 |

OTHER PUBLICATIONS

Oct. 10, 2018 International Search Report issued in International Patent Application No. PCT/EP2018/071452.

\* cited by examiner

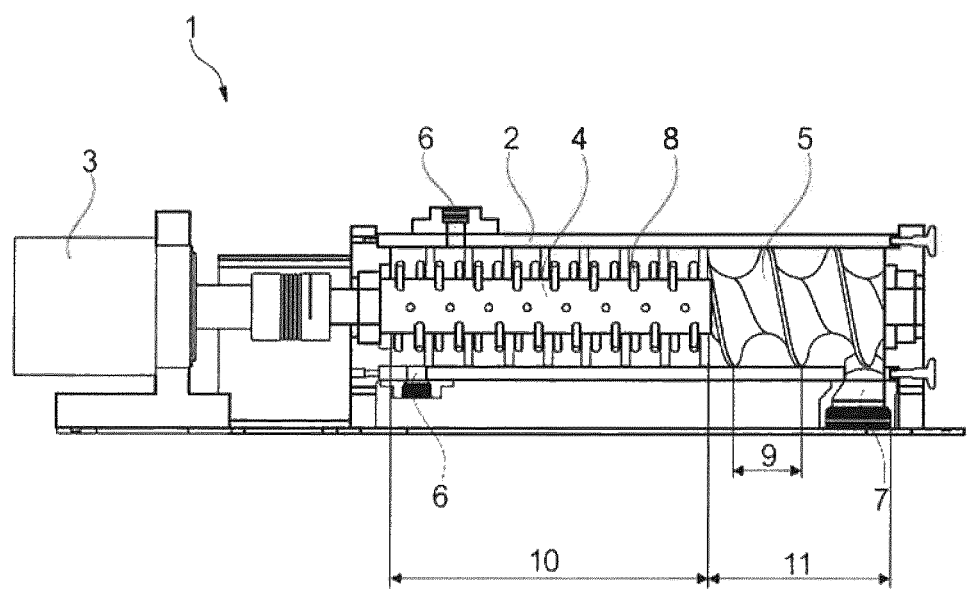

METHOD FOR THE APPLICATION OF MINERAL BINDER COMPOSITIONS CONTAINING FIBRES

TECHNICAL FIELD

The invention relates to a method for applying fiber-containing mineral binder compositions and also to shaped bodies produced therewith.

PRIOR ART

A number of attempts have been made in recent years to produce edifices, parts of edifices, or other shaped pieces without formwork, through the 3D printing of building materials, especially of cementitious materials. The 3D printing process here allows new dimensions in shaping.

In the 3D printing of building materials, especially of cementitious building materials, however, there are a number of problems which have not yet been satisfactorily resolved.

Cement attains its strength through reaction with water in a chemical process called cement hydration. The time from the mixing of the cement with water to the attainment of sufficient strength for self-support is typically in the range of several hours. 3D printing, however, requires rapid development of the strength or at least good shape stability on the part of the material applied.

Certain users have therefore employed concrete or mortar mixtures which contain very little water and are therefore very stiff. Such mixtures can be conveyed only over short distances and with high pumping pressure, and the shaped body produced in this way often contains defect sites, such as air inclusions, for example, is visually nonuniform, and/or exhibits a poor bond between the individual layers applied.

CN 203357623 describes a method with which a part of the water is withdrawn by vacuum from the concrete shortly before said concrete is applied, to give a stiff, self-supporting material. Such installations are expensive, complicated, and undesirably increase the weight of the printing head, and the resultant material is often not uniform, with the possible consequences both of visual deficiencies and of cracking.

WO 2013/064826 describes a method for the layer-by-layer application of a cementitious material. The addition of an accelerator is described which is carried out via a separate inlet, mounted in the vicinity of the nozzle with which the cementitious material is delivered, without the use of a mixing device for mixing the accelerator with the cementitious material. The arrangement described is unsuitable for effective mixing of the cementitious material with the accelerator.

Fibers are added to building materials such as mortar and concrete for a variety of reasons. Fibers may improve the rheological properties of fresh mortar and fresh concrete; they may increase the freeze-thaw salt resistance and the fire resistance, may diminish shrinkage, may bridge small cracks, and may be a partial or complete replacement for the reinforcement, depending on the use of the concrete or mortar.

Fibers are especially advantageous in the 3D printing of mortar or concrete, since in this case there is no possibility of using prefabricated reinforcement.

Fibers also improve the cohesion of the mixture, and the flexural tensile strength and durability of the shaped pieces produced.

Fibers, though, also have drawbacks.

In the mixing and conveying of the dry or wet building material mixture, the fibers easily form lumps and may block conveying lines. They may also accumulate at parts of the pumps or of mixers, thereby blocking them or even causing damage to them.

In 3D printing, however, a uniform and continuous application of building material mixture is vital. Possible consequences of interruptions to printing are that the entire shaped piece produced up to that point becomes unusable.

During application of fiber-containing building material mixtures, the fibers often adopt an orientation in one direction, thereby severely restricting their effectiveness for the cohesion of the layers in 3D printing and for the prevention or bridging of microcracks.

CN 106007587 describes a mortar comprising fibers for 3D printing. For this purpose, a powder component and aqueous component are separately provided and then jointly applied.

DE 32 13 349 A1 describes an apparatus for the remixing or ready-mixing of concrete on the building site. In this case there are additives that can be admixed continuously to the concrete, such as air inclusion agents, plasticizers, and fibers.

EP 0 035 281 A2 describes a method for mortar spraying. Here, a dry mixture is conveyed by means of a stream of air, and the mixing water or an aqueous solution is added to this stream before the mixture is blown from the nozzle.

U.S. Pat. No. 4,778,276 A describes an apparatus for continuous mixing of a hydraulically setting composition with water and fibers.

The existing methods do not provide a satisfactory solution to the problems which occur in the 3D printing of fiber-containing building material mixtures. There is therefore a need for improved methods for the 3D printing of fiber-containing building material mixtures, these methods as far as possible overcoming the disadvantages identified above.

SUMMARY OF THE INVENTION

It is an object of the present invention, therefore, to provide an improved method for the 3D printing of fiber-containing mineral binder compositions. The method is intended in particular to enable efficient, reliable, and extremely rapid and uninterrupted application of the fiber-containing mineral binder composition. At the same time, where possible, the layers applied are to be of high quality in terms of strength development and visual uniformity. Surprisingly this object is achieved by a method as described in claim 1.

The effect of separating the steps of providing the hydrous mineral binder composition and of mixing the aqueous accelerator with the hydrous binder composition gives the method great flexibility. The hydrous mineral binder composition remains readily workable over a relatively long period, because the aqueous accelerator is mixed in only with the continuous mixer. This avoids a high pressure in the conveying device, especially in a hose, between pump and continuous mixer, and also prevents premature stiffening or hardening of the binder composition, especially in the case of unplanned waiting times. Moreover, the site where the hydrous binder composition is provided may be physically remote from the site of application, this being an advantage on account of the often confined space conditions at the printing location.

The use of fibers in the mixture increases the resistance to fracture and crack propagation, brings about a reduction in the shrinkage and reduction in small shrinkage cracks, improves the fire resistance, and increases the flexural tensile strength in the finished shaped body. Depending on the fibers used, fibers may additionally improve the cohesion of the layers applied.

Through the use of the continuous mixer having at least one dynamic mixing element, the mixing of the aqueous accelerator, the fibers and the hydrous mineral binder composition is very good and effective, and so the layers applied cure uniformly and rapidly.

Surprisingly, neither in the mixer nor in the printing device, is there any agglomeration of the fibers; the accelerated binder composition can be applied rapidly and without interruption, and the fibers are distributed evenly in the accelerated hydrous binder composition.

Surprisingly, the delivery of material from the mixer is very constant, this being the case even if the pumping power when conveying the hydrous mineral binder composition is subject to fluctuations, as often occurs with usual concrete or mortar pumps.

Surprisingly, after the mixer, the accelerated binder composition is devoid of coarse air inclusions and is very uniform, the fibers are evenly distributed in all directions, and the shape of the applied layers is very uniform and visually appealing without defect sites. Interlayer adhesion, this being the adhesion between adjacent layers, is surprisingly well pronounced, and so the regions between the layers do not constitute weak points.

Through the method it is possible to apply the fiber-containing accelerated binder composition reliably, rapidly, and in uniform layers, thereby enabling the production even of large shaped bodies easily, with minimum time involved, and with esthetic appeal.

Other aspects of the invention are subjects of further independent claims. Particularly preferred embodiments of the invention are subjects of the dependent claims.

WAYS OF EXECUTING THE INVENTION

A subject of the invention is a method for applying a fiber-containing building material, especially by 3D printing, comprising the steps of
providing a hydrous mineral binder composition, at least one aqueous accelerator and fibers,
feeding the hydrous mineral binder composition, especially by means of a pump, to a continuous mixer comprising
a drive,
a mixing region comprising at least one inlet and at least one dynamic mixing element and
a conveying region connected to the mixing region and comprising at least one conveying device and an outlet,
the hydrous mineral binder composition being conveyed through the at least one inlet into the mixing region,
feeding the fibers into the mixing region (10) of the continuous mixer (1)
feeding at least one aqueous accelerator for the setting of the hydrous mineral binder composition into the mixing region of the continuous mixer,
mixing the at least one aqueous accelerator with the hydrous mineral binder composition and the fibers in the mixing region of the continuous mixer to give an accelerated fiber-containing mineral binder composition,
conveying the accelerated fiber-containing mineral binder composition by means of the conveying device to the outlet, and
applying the accelerated fiber-containing mineral binder composition, in particular layer by layer by way of a movable printing head.

3D printing is a formwork-free shaping method. The material is applied layer by layer to generate three-dimensional objects. This layer-by-layer construction takes place under computer control from one or more liquid or solid materials according to specified masses and shapes.

"3D printing", also referred to as "freeform construction", is understood in the present document as referring to a method for producing shaped bodies by applying a formable material in a plurality of layers or relatively small portions, where a solid, shaped body is formed after curing. The layers in this case are not applied by spraying.

A "mineral binder" is understood in the present document as referring in particular to a binder which reacts in the presence of water, in a hydration reaction, to form solid hydrates or hydrate phases.

A "mineral binder composition" is understood in the present document as referring, correspondingly, to a composition comprising at least one mineral binder. This composition includes in particular the binder, fillers, and optionally one or more admixtures.

A "hydrous mineral binder composition" is understood in the present document as referring to a mineral binder composition mixed with water, the composition being more particularly in fluid form.

A "cementitious binder" is understood in the present document as referring in particular to a binder having a cement clinker fraction of at least 5 wt %, more particularly at least 20 wt %, preferably at least 35 wt %, especially at least 65 wt %, with a maximum content of 100 wt %. The cement clinker preferably comprises a Portland cement clinker, a calcium aluminate clinker, or a calcium sulfoaluminate clinker. Cement clinker in the present context is a reference more particularly to ground cement clinker.

"Fibers" are understood in the present document as referring to materials for which the ratio of length to diameter or of length to equivalent diameter is at least 10:1. This ratio is also referred to as form factor.

The "equivalent diameter of a fiber" is understood in the present document as referring to the diameter possessed by a circle whose area is the same as the cross-sectional area of a fiber having a non-round cross section.

"Mortar" or "concrete" is understood in the present document as referring to aqueous dispersions which comprise at least one cement and at least one mineral filler and which are capable, after the hydration of the cement, of curing in a solid shape.

"Mortar" is understood in this context as referring to dispersions comprising fillers having particle sizes of up to at most about 8 mm, and "concrete" to dispersions which also include fillers having particle sizes above 8 mm.

"Fresh mortar" or "fresh concrete" is understood in the present document as referring to a mortar or concrete immediately after the mixing of the constituents with water.

"Self-supporting" is understood in the present document as referring to a material property whereby the material after shaping changes individual dimensions by not more than 10% in the absence of any external force. This means that an extruded strand with a square cross section and a side length of 10 mm has, after curing, a height of 9 to 10 mm and a width of 10 to 11 mm.

A "dynamic mixing element" is understood in the present document as referring to a component which comprises movable elements and is suitable for mixing solid and/or liquid constituents.

In the method, a hydrous mineral binder composition is provided. This composition comprises at least one mineral binder. A suitable mineral binder is, in particular, a mineral binder which reacts in the presence of water, in a hydration reaction, to form solid hydrates or hydrate phases. This may in particular be a hydraulic binder, which can be hardened with water even under water, such as especially cement or hydraulic lime, or a latent hydraulic binder, which sets with water under the action of admixtures, such a binder more particularly being slag, or a pozzolanic binder, such as, in particular, fly ash, or a nonhydraulic binder, such as, in particular, gypsum in the form of anhydrite or hemihydrate gypsum.

The mineral binder is preferably selected from the group consisting of cement, gypsum, burnt lime, slag, and fly ash, and mixtures thereof.

The mineral binder composition preferably comprises at least one hydraulic binder, preferably a cementitious binder, more particularly Portland cement, calcium aluminate cement, calcium sulfoaluminate cement, or mixtures thereof.

The cement used may be any available cement type or a mixture of two or more cement types, examples being the cements classified under DIN EN 197-1: Portland cement (CEM I), Portland composite cement (CEM II), blast furnace slag cement (CEM III), pozzolanic cement (CEM IV), and composite cement (CEM V). Cements produced according to an alternative standard, such as the ASTM standard or the Indian standard, for example, are of course equally suitable.

Particularly preferred is a cement according to European Standard EN 197-1, a calcium sulfoaluminate cement, a calcium aluminate cement, or mixtures thereof, optionally in a mixture with calcium sulfate.

The most preferred is Portland cement or a cement including Portland cement according to EN 197-1. Portland cement is particularly readily available and allows mortars to have good properties.

Also especially suitable are mixtures of cement, calcium aluminate cement, and calcium sulfate, or mixtures of cement and calcium sulfoaluminate cement. Such binder mixtures allow short setting times and high early strengths.

As a proportion of the overall mineral binder, the hydraulic binder is preferably at least 5 wt %, especially at least 20 wt %, more preferably at least 35 wt %, in particular at least 65 wt %, with a maximum fraction of 100 wt %. According to a further advantageous embodiment, the mineral binder consists to an extent of 95 to 100 wt % of hydraulic binder, more particularly of cement clinker.

It may also be advantageous if the binder composition comprises other binders in addition to or instead of a hydraulic binder. These other binders are, in particular, latent hydraulic binders and/or pozzolanic binders. Particularly suitable latent hydraulic and/or pozzolanic binders are slag, foundry sand, fly ash and/or silica fume.

The mineral binder composition preferably further comprises fillers, especially mineral fillers. Fillers are chemically inert, solid, particulate materials and are available in various shapes, sizes and as different materials, varying from extremely fine particles of sand to large coarse stones. All fillers typically employed for concrete and mortar are suitable in principle. Examples of particularly suitable fillers are rock particle size fractions, gravel, sand, especially silica sand and limestone sand, comminuted stones, calcined pebbles or lightweight fillers such as expanded clay, expanded glass, foamed glass, pumice, perlite, and vermiculite. Other advantageous fillers are calcium carbonate, aluminum oxide, amorphous silica (silica fume), or crystalline silica (quartz flour).

The particle size is guided by the application and is situated in the range from 0.1 μm to 32 mm or more. Preference is given to mixing different particle sizes in order to provide optimum establishment of the properties of the hydrous mineral binder composition. Fillers composed of different materials can also be mixed. The particle size may be determined by means of sieve analysis.

Preferred fillers are those having particle sizes of not more than 8 mm, more preferably not more than 5 mm, more preferably still not more than 3.5 mm, most preferably not more than 2.2 mm.

The mineral binder composition preferably comprises fillers of which at least 30 wt %, more preferably at least 40 wt %, most preferably at least 50 wt % are smaller than 2 mm, preferably smaller than 1 mm, more preferably smaller than 0.5 mm, based on a total amount of 100 wt % of all fillers in the binder composition.

Suitable fillers of low particle size are, in particular, fine silica sands or calcium carbonate powders.

Binder compositions having such particle sizes are readily conveyable, can be mixed well with the aqueous accelerator in the continuous mixer, and result in a very uniform surface after application.

There are specific applications in which fillers having particle sizes of up to 32 mm may also be used, more preferably up to 20 mm, most preferably up to 16 mm.

The building material applied comprises fibers. Suitable fibers are in principle all those which are largely inert in an aqueous cementitious medium. The fibers may have a round or else otherwise-shaped cross section; preference is given to round fibers or to flat fibers having an approximately rectangular cross section.

Preferred fibers are selected from the group consisting of metal fibers especially steel fibers or amorphous metal fibers, mineral fibers, especially glass fibers, basalt fibers or wollastonite fibers, natural fibers, especially cellulose fibers, hemp fibers, linen fibers or silk fibers, and polymeric fibers, especially carbon fibers, fibers of polypropylene, polyethylene, polyvinyl alcohol, polyamide, polyaramid, polyacrylonitrile or polyester, and mixtures thereof, especial preference being given to metal fibers, carbon fibers, fibers of polypropylene or fibers of polyvinyl alcohol, or mixtures thereof.

Fibers of copolymers, especially those comprising propylene units and/or ethylene units, or fibers of polymer mixtures, especially those comprising polypropylene, are likewise suitable.

Such fibers are available commercially in large quantities and in different sizes.

It has surprisingly emerged that fibers which are flexible or bendable have less of a tendency to clog and/or to block the mixing and/or conveying devices and also give rise to virtually no mechanical damage to the devices.

Preferred fibers are therefore those which are flexible, more particularly having a flexural stiffness of not more than 20 N·mm$^2$, preferably not more than 10 N·mm$^2$, more preferably not more than 1 N·mm$^2$, very preferably not more than 0.2 N·mm$^2$, the flexural stiffness in the case of flat fibers referring to the flexural direction in which the least force is required for flexure.

The flexural stiffness here is calculated from the product of the elasticity modulus of the fiber and the geometrical moment of inertia of the fiber cross section.

The fibers preferably have a length of 5 to 100 mm.

The ratio of fiber length to fiber diameter or equivalent diameter is preferably at least 10, more preferably at least 30, more preferably still at least 50, most preferably at least 100.

Preferred fibers are those which a) are round and have a length of 5 mm to 100 mm, more preferably of 8 mm to 60 mm, yet more preferably of 10 mm to 30 mm, most preferably of 12 mm to 20 mm, and a diameter of 5 μm to 500 μm, more preferably of 7 μm to 300 μm, yet more preferably of 10 μm to 250 μm, most preferably of 14 μm to 200 μm, or b) are flat and have a length of 5 mm to 100 mm, more preferably of 8 mm to 60 mm, yet more preferably of 10 mm to 30 mm, most preferably of 12 mm to 20 mm, a width of 5 μm to 2 mm, more preferably of 10 μm to 1.5 mm, most preferably of 0.5 mm to 1.2 mm, and a height of 5 μm to 300 μm, more preferably of 7 μm to 250 μm, yet more preferably of 10 μm to 200 μm, most preferably of 20 μm to 150 μm.

Fibers having these dimensions can be mixed effectively into the building material and are especially suitable for improving the properties of the building material.

It is also possible for different fibers to be mixed. The differences may be in the material, in the length and/or in the diameter or equivalent diameter of the fibers.

Hydrous binder composition together with such fibers can be effectively conveyed and printed in the method of the invention without blocking the conveying, mixing or printing device, and improve the cohesion of the layers applied.

The fibers may have a specially treated surface, and more particularly may have been mechanically or chemically roughened, embossed, or coated.

The fibers may also have undergone special shaping—in particular, they may be hooked at the ends or may have a knotlike, serrated or wave-shaped structure.

Fibers with a special structure or surface adhere particularly well in the mineral binder matrix.

Preferably, one cubic meter of the building material comprising the fibers contains 0.4 to 25 liters of fibers, more preferably 0.5 to 20 liters of fibers, very preferably of 1 to 15 liters of fibers, calculated with the apparent density of the fibers.

Depending on fiber type, an amount of fibers of this kind improves the properties of the cured binder composition without excessively influencing the conveyability and miscibility of the hydrous mineral binder composition.

In one exemplary embodiment, the fibers are provided in the hydrous mineral binder composition.

In one exemplary development, the fibers in the hydrous mineral binder composition are fed to the mixer.

The providing and/or feeding of the fibers in the hydrous mineral binder composition has the advantage that consequently there are no additional components which must be fed to the mixer, and that the fibers are already distributed in the hydrous mineral binder composition prior to mixing.

In an alternative embodiment, the fibers are provided in the aqueous accelerator and/or are fed in the aqueous accelerator to the mixer.

In another alternative embodiment, the fibers are provided in an additional component, more particularly in an additional aqueous component, and/or in an additional component, more particularly in an additional aqueous component, are fed to the mixer.

In a further alternative embodiment, the fibers per se, i.e., without further constituents, especially liquid constituents, are provided and/or fed to the mixer.

The hydrous mineral binder composition may optionally include at least one additive, as for example a concrete admixture and/or a mortar admixture and/or process chemicals. The at least one additive more particularly comprises a defoamer, a wetting agent, a dye, a preservative, a plasticizer, a retarder, further accelerators, a polymer, an air entrainer, a rheological assistant, a viscosity modifier, a pumping assistant, a shrinkage reducer, or a corrosion inhibitor, or combinations thereof.

The use of a plasticizer or superplasticizer in the hydrous mineral binder composition enhances the fluidity of the composition. Examples of suitable plasticizers include lignosulfonates, sulfonated naphthalene-formaldehyde condensates, sulfonated melamine-formaldehyde condensates, sulfonated vinylcopolymers, polyalkylene glycols having phosphonate groups, polyalkylene glycols having phosphate groups, polycarboxylates or polycarboxylate ethers, or mixtures of the stated plasticizers, polycarboxylate ethers being understood as comprising comb polymers having anionic groups on the polymer backbone and having polyalkylene oxide side chains, the anionic groups being selected in particular from carboxylate groups, sulfonate groups, phosphonate groups, or phosphate groups.

The plasticizer preferably comprises a polycarboxylate ether. More particularly, the plasticizer is a comb polymer comprising a polycarboxylate backbone with polyalkylene oxide side chains bonded to it, especially polyethylene oxide side chains. These side chains are bonded to the polycarboxylate backbone in particular by way of ester, ether, imide and/or amide groups. Such comb polymers are also sold commercially by Sika Schweiz AG under the tradename range Sika® ViscoCrete®.

The use of hardening retarders may be advantageous since, as a result, it prolongs the working time of the hydrous binder composition. The hardening retarder is preferably a hydroxycarboxylic acid, more particularly tartaric acid, citric acid or gluconic acid; a sugar, more particularly sucrose; a phosphate or a phosphonate; or salts thereof or mixtures of these.

The use of rheological assistants may be advantageous since, as a result, it allows the cohesion of the composition to be improved. Preferred rheological assistants are natural or modified polysaccharides, especially cellulose ethers or cellulose esters, starch, modified starch, xanthan, welan, diutan or carrageenan.

With more particular preference the rheological assistant is methylcellulose, hydroxyethylcellulose, methyl-hydroxyethylcellulose, or xanthan gum, or mixtures thereof.

The use of pumping assistants may be advantageous because the internal cohesion, the smoothness, and the lubricity of the composition are enhanced. The pumping assistant preferably comprises water-soluble polymers, such as, in particular, SikaPump® from Sika.

In one preferred embodiment, the binder composition comprises a polymer, particularly a water-insoluble, film-forming polymer. Film-forming polymers, when present as a dispersion in a liquid, are able to coagulate to form films when the dispersion dries. The polymer is preferably a homopolymer or copolymer of acrylic esters, a copolymer of styrene and butadiene, a copolymer of styrene and acrylic esters, or a homopolymer or copolymer of vinyl acetate.

Aqueous dispersions of such polymers are available commercially, under the tradenames Acronal® (BASF), Primal™ (DOW), or Revacryl (Synthomer), for example.

It is, however, also possible to use redispersible polymer powders which form dispersions when mixed with water. Polymer powders of these kinds are available commercially, under the tradenames Vinnapas® (Wacker) or Elotex® (AkzoNobel), for example.

The mineral binder composition in particular comprises a hydraulic binder composition, preferably a mortar or concrete composition, or consists of such a composition.

If the fibers are provided in the hydrous mineral binder composition, the fiber-containing hydrous mineral binder composition is provided preferably by mixing of a dry, fiber-containing mineral binder composition with water.

The fibers, however, may also be added only after the mixing of the mineral binder composition, containing no fibers, with water.

The water may further still comprise additives in dissolved or dispersed form.

The additives, however, may also be mixed after the addition of the water, as solids or in dissolved form, with the hydrous mineral binder composition.

The production of such mixtures is familiar to the person skilled in the art from the provision of mortars or concrete mixtures may take place in particular in a batch mixer or else in a continuous mixer.

The hydrous mineral binder composition is preferably a fresh mortar having a slump of at least 170 mm, more preferably of 200 to 380 mm, very preferably of 250 to 350 mm, determined according to DIN EN 1015-3 after the raising of the slump cone without lifts of the flow table.

More preferably the hydrous mineral binder composition is a fresh concrete having a slump of at least 100 mm, preferably at least 200 mm, most preferably at least 250 mm, determined according to DIN EN 12350-2.

Hydrous mineral binder compositions with a consistency of this kind are particularly easy to pump and convey and can be mixed very well with the aqueous accelerator in the continuous mixer.

The hydrous mineral binder composition preferably comprises the following constituents:
- 15-50 parts by weight of cement,
- 40-65 parts by weight of fillers,
- 0.02-3.5, preferably 0.20-2, more preferably 0.85-1.6 parts by weight of natural or polymeric fibers, or
- 0.20-8, preferably 0.9-6, more preferably 1-5 parts by weight of metal fibers,
- 0.01-5 parts by weight of additive and
- 8-25 parts by weight of water,
based on 100 parts by weight of hydrous mineral binder composition.

The hydrous mineral binder composition is fed, preferably by means of a pump and a conveying line, in particular a hose, from the site of the providing to the continuous mixer.

Good conveyability is important for 3D printing, being a prerequisite for uniform application.

Especially for the printing of large shaped parts, the length of a conveying line between pump and continuous mixer may reach up to 50 m or more, possibly resulting in high pressure in the conveying line. A high pressure, especially in a hose, is disadvantageous because it greatly stresses the material, which if overloaded may burst. Compositions with good conveyability are able to prevent an excessive buildup of pressure. The pressure in the conveying line between pump and continuous mixer is preferably below 40 bar, more preferably below 25 bar.

Before the hydrous mineral binder composition is conveyed, a preferred possibility is to convey a so-called "lubricating mix" through the conveying line and printing device. The "lubrication mix" is not applied; typically it is disposed of into a waste container. Suitable lubricating mixes are, in particular, aqueous solutions of an organic polymer, especially SikaPump® Start 1, or a highly mobile mixture of water and cement and/or fine filler, especially limestone. With preference, first an aqueous polymer solution and then a highly mobile mixture of water and cement and/or fine filler are pumped through the conveying line and printing device, before the hydrous mineral binder composition is conveyed.

The hydrous mineral binder composition is mixed with an aqueous accelerator.

The accelerator is advantageously a solidification accelerator and/or a hardening accelerator, or a mixture of these.

There are a multiplicity of substances known to a person skilled in the art that can be used as accelerators.

The aqueous accelerator preferably comprises at least one compound selected from the group consisting of amino alcohols, alkali metal and alkaline earth metal nitrates, alkali metal and alkaline earth metal nitrites, alkali metal and alkaline earth metal thiocyanates, alkali metal and alkaline earth metal halides, alkali metal and alkaline earth metal carbonates, glycerol, glycerol derivatives, glycols, glycol derivatives, aluminum salts, aluminum hydroxides, alkali metal and alkaline earth metal hydroxides, alkali metal and alkaline earth metal silicates, alkali metal and alkaline earth metal oxides, crystallization nuclei, especially calcium silicate hydrate compounds in finely divided form, and mixtures thereof.

With particular preference the aqueous accelerator comprises an aluminum salt or aluminum hydroxide, especially sodium aluminate, potassium aluminate, aluminum sulfate, aluminum hydroxysulfate, aluminum hydroxide, or mixtures thereof.

Aluminum compounds of these kinds accelerate the setting of a hydraulic binder especially well.

With preference it is also possible for two or more aqueous accelerators differing in their composition to be added together or separately from one another.

In this way, for example, there is the possibility of flexible adaptation to a very wide variety of different applications.

The metering of the accelerator is dependent on the constitution of the hydrous mineral binder composition, especially on the nature and amount of the hydraulic binder, the nature and amount of the retarder, if present, and the amount of water, and also on the ambient temperature and the temperature of the hydrous binder composition.

The accelerator is preferably metered in an amount such that the accelerated composition remains readily shapeable for several seconds to several minutes.

This allows the layers to be applied uniformly, said layers developing a good cohesion, and the surface of the shaped body produced can if desired be subsequently aftertreated—smoothed, for example.

The aqueous accelerator is metered preferably in an amount in the range from 0.1 to 8 parts by weight, more preferably 0.3 to 5 parts by weight, more preferably still 0.5 to 2.5 parts by weight, calculated as solid without water, based on 100 parts by weight of mineral binder.

The aqueous accelerator is mixed with the fibers and the hydrous binder composition using a dynamic continuous mixer.

Besides the accelerator, there are further additives which may be mixed with the hydrous binder composition using the mixer.

The at least one aqueous accelerator and any further additives are metered preferably via metering devices in the region of the continuous mixer.

The hydrous mineral binder composition and the aqueous accelerator, and, optionally, further additives, may be conveyed to the mixer by way, for example, of one or more conveying devices, especially pumps and conveying lines. These conveying devices can be controlled in particular via a control unit, especially independently of one another.

The continuous mixer is preferably mounted on the movable printing head.

The printing head preferably comprises a delivery nozzle for the accelerated mineral binder composition.

The dynamic continuous mixer is mounted on the movable printing head preferably in direct association with this delivery nozzle. As a result, the development of strength by the mineral binder over time can be tailored. In particular, application as a whole can be greatly accelerated through addition of an accelerator.

The dimensions and the weight of the continuous mixer are preferably adapted to the size of the printing head. It is advantageous, accordingly, if the mixer in a printing device for relatively small shaped parts is also smaller than the mixer in a printing device for large shaped parts such as house parts or walls.

The continuous mixer may thus have a weight of 20 to 100 kg or more for the printing of shaped parts in an order of magnitude of several meters, or a weight of about 1 to 20 kg for the printing of shaped parts in an order of magnitude of about 5 cm to 1 m.

With the continuous mixer, the accelerator is mixed very rapidly, efficiently, and uniformly into the mineral binder composition.

This is important so that the composition during application is uniform and cures evenly and rapidly.

In one exemplary embodiment, the mixer comprises more than one inlet, especially two, three, four, five, six, seven, or eight inlets.

An advantage of providing a plurality of inlets is that it allows constituents, especially those which react with one another or are not stable when stored together, to be fed to the mixing region of the mixer through separate inlets.

The mixer is operated preferably at a stirring shaft speed of 500 to 3000 revolutions per minute, more preferably of 650 to 2500 revolutions per minute, more preferably still of 800 to 2000 revolutions per minute, most preferably of 1000 to 1500 revolutions per minute.

Mixing at high speed produces a rapid and efficient mixing of the binder composition with the accelerator, this being especially important since a poorly distributed accelerator in the aqueous mineral binder composition leads very rapidly, locally, to very high viscosity and/or to hardening of the binder, with the possible consequences of blocking and/or damaging of the mixer. If, on the other hand, the accelerator is mixed very rapidly and efficiently with the aqueous mineral binder composition, then the increase in viscosity, and the hardening, take place uniformly and controllably, without blocking of the mixer, and the accelerated mineral binder composition can be applied without disruptions.

The residence time of the hydrous mineral binder composition in the mixer is preferably less than 10 s, more preferably less than 7 s, very preferably less than 4 s.

The mean residence time of the binder composition in the mixing device is the average period of time for which a particle resides in the mixing device, from the inlet to the outlet.

Using the dynamic mixer, especially in the preferred form, surprisingly produces not only very good distribution of the accelerator in the fiber-containing binder composition, leading to uniform curing of the accelerated binder composition without lumps being formed, but also good fiber distribution, without the fibers accumulating or packing together, thereby allowing 3D printing to take place quickly and without interruption due to clogging.

With the mixer it is also possible, surprisingly, to compensate for the customary minor fluctuations in the constitution of the hydrous mineral binder composition, such as fluctuations in water content, in the particle size distribution of the fillers, or in cement quality, and consequently this method becomes very robust, this being an exceptional advantage.

The accelerated binder composition is highly deformable immediately after the accelerator has been mixed in, and can be applied in uniform layers using especially a movable printing head.

The applied layers are self-supporting after a short time, and exhibit rapid development of strength. Subsequent layers can therefore be applied at short intervals and to a height of several centimeters, without problems.

The accelerated binder composition is applied preferably by way of a movable printing head.

The printing head in particular possesses at least one delivery aperture, which may be identical to the outlet of the continuous mixer, through which the curable material can be delivered.

At the delivery aperture there is preferably a delivery nozzle which shapes the material delivered. There is no restriction on the shape, though it ought to be adapted to the maximum particle size of the material to be delivered.

The delivery nozzle preferably has a rectangular, square or round shape.

The delivery nozzle preferably has a cross section wherein the smallest side or the diameter is at least as large as 40%, preferably at least 60%, more preferably at least 80% of the length of the longest fibers.

There may be further shaping elements mounted in the delivery nozzle.

Following application of the layers, the fibers, surprisingly, rather than being oriented in one specific direction, are instead distributed evenly in all spatial directions, on a majority basis. As a result it is possible to prevent or reduce shrinkage and possible microcracks in all spatial directions.

In one preferred variant, the printing head can be moved in one, two or three spatial directions. Particularly preferred is a printing head which can be moved in three spatial directions. This allows shaped bodies of virtually any desired shape to be produced in a particularly simple way.

The movement of the printing head may be realized in particular by the mounting of the printing head on a conventional robotic arm which can be moved in one, two or three spatial directions.

The printing head is preferably located on a 3-axis portal robot system. This allows the rapid printing even of large shaped bodies with flexible shaping.

Another possibility is to realize movements in one, two or three spatial directions through corresponding movements of the building space region. The building space region in this context is that region—a surface, for example—on which the shaped body is being constructed.

The accelerated mineral binder composition when it has been provided and applied at 21° C., 8 hours, more preferably 4 hours, most preferably 1 hour after mixing with the aqueous accelerator preferably has a compressive strength of at least 10 MPa, the compressive strength being determined according to EN 196-1.

Shaped bodies can be produced surprisingly quickly by layer-by-layer application with the method of the invention.

The height of an individual layer, measured typically in a direction substantially perpendicular to the planes formed by individual layers, more particularly in a vertical direction, is preferably 5 mm to 200 mm, more preferably 8 mm to 100 mm, more particularly 10 mm to 50 mm.

The total height of the shaped body, or the thickness of all the individual layers of the shaped body taken together, is preferably 0.1 m to 100 m or more, more preferably 0.3 m to 30 m, more preferably still 0.5 m to 10 m, more particularly 1 m to 3 m. This is especially the case if the mineral binder composition comprises or consists of a mortar or concrete composition.

While it is still workable, the surface of the shaped body may, using suitable tools, be smoothed, corrected or specially deformed. This may take place as part of the mechanical fabrication, or manually as a separate step. The surface may also be provided with a functional or decorative coating, with a paint, for example.

While it is still workable, the shaped body may also be cut using suitable tools. Thus it is possible for holes, especially for window openings, door openings, conduit passages, or else cuts, especially for later working steps, to be made in the shaped body.

The shaped body produced with the method of the invention may have almost any desired form. The shaped body is, for example, an edifice, a fabricated part for an edifice, a construction element, a masonry construction, a bridge, a column, a decorative element such as, for example, artificial hills, reefs or sculptures, a pond, a well, or a trough. The shaped body in this case may represent a solid shape or a hollow shape, with or without a base.

The shaped body may be produced directly on site and no longer moved after the application. Alternatively the shaped body may be produced at another site, especially in a plant. This is done preferably on a base to which the shaped body does not attach. After it has cured, the shaped body can be transported to the desired site.

A further subject of the present invention is a shaped body produced by the method of the invention.

EXAMPLES

Exemplary embodiments are given below which are intended to elucidate in more detail the invention described. The invention is of course not limited to these exemplary embodiments described.

Materials Used

Sigunit®-L53 AF (CC) is an aqueous, alkali-free accelerator based on aluminum sulfate, with a solids content of around 52 wt %, available from Sika. Betoflow® D is a fine calcium carbonate powder of 1-5 µm particle size, available from Omya.

Nekafill® 15 is a finely ground limestone, available from Kalkfabrik Netstal.

Sika® ViscoCrete®-3088 S is an aqueous retarder/plasticizer based on a polycarboxylate ether, available from Sika.

Carbowet® 4000 is a wetting agent, available from Air Products Chemicals Europe.

Kuralon™ PVA Fiber RFS 400 is a polyvinyl alcohol fiber of 18 mm length with a diameter of 200 µm, available from Kuraray Europe GmbH.

Fibraflex fibers are flat amorphous metal fibers of 15 mm length, 1 mm width, and 24 µm height, available from Saint-Gobain.

SikaPump® is a pumping assistant comprising water-soluble polymers, available from Sika.

Inventive Example 1

A fresh mortar was prepared from 120 kg of Portland cement CEM I 52.5, 92 kg of 0-1 mm silica sand with a moisture content of about 2 percent by weight, 33 kg of Betoflow®-D, 80 kg of Nekafill® 15, 1.6 kg of Sika® Viscocrete®-3088 S, 2.15 kg of Kuralon™ RFS fibers, 0.004 kg of Carbowet® 4000 and 56.8 kg of water.

First, all of the solid constituents of the mortar except for the fibers were mixed in a forced mixer for 1 minute, and then the water, Carbowet and Viscocrete were added and the mortar was mixed thoroughly for 3 minutes more. Lastly, the fibers were slowly added and the mortar was mixed until the fibers were uniformly distributed.

The fresh mortar had a slump of 315 mm, measured according to DIN EN 1015-3 after the raising of the slump cone without lifts of the flow table.

A 3-axis portal robot was used for 3D printing.

The portal robot was equipped with a printing head which could be moved in all 3 spatial directions.

Integrated in the printing head was a dynamic continuous mixer with a weight of around 60 kg. The construction of the mixer was as shown in FIG. 1. It had an inlet for the mortar, an inlet for the aqueous accelerator, and an outlet for the accelerated mortar. The drum contained the mixing region and the conveying region, and had a diameter of about 100 mm. In the mixing region there was a stirring shaft with a total of 46 pegs with a spacing of about 24 mm, and directly thereafter and arranged on the same axis there was a screw conveyor having 3 turns with a 26 mm spacing. The inlets were positioned in the region of the stirring shaft, and the outlet was positioned at the end of the screw conveyor. Mounted on the outlet was a circular nozzle having a diameter of 40 mm.

The conveying device between the forced mixer in which the mortar was mixed and the dynamic continuous mixer on the printing head consisted of a screw pump, and a hose having an internal diameter of 35 mm and a total length of 32 m.

Ahead of the first mortar mixture, a mixture of one pouch of SikaPump® Start 1 and 30 l of water and subsequently a mixture of 15 kg of Nekafill® 15 and 15 kg of water were conveyed through the printing device—that is, through the hose, the mixer, and the printing head—into a waste trough.

The fiber-comprising mortar was subsequently conveyed through the hose to the inlet of the mixer at a conveying rate of about 33 kg/min.

With a conveying rate of about 350-400 ml/min, prediluted Sigunit®-L53 AF (CC) (75 weight % Sigunit®-L53 AF (CC) and 25 weight % water) was conveyed from a reservoir vessel to the second inlet of the mixer, through a hose and with a pump.

The fresh mortar and the accelerator were mixed in the mixer continuously at about 1200 revolutions of the stirring shaft per minute, and the accelerated mortar was applied via the outlet and the nozzle of the printing head in layers of about 50 mm width and 10 mm height.

A pipe about 800 mm in diameter, about 800 mm in height and about 50 mm in wall thickness was built up layer by layer onto a base lined with plastic film, with a printing rate of 20-30 meters per minute.

The conveying rate of the mortar mixture, the metering of the accelerator, the rotational velocity of the continuous mixer, and the movement of the printing head here were controlled via a computer program.

The conveying and printing of the mortar mixture took place without problems, and without any instances of blocking or clogging.

The temperature of the hydrous mortar mixture was about 19° C., that of the ambient air about 21° C.

Throughout the printing operation, the pressure in the hose for conveying the fresh mortar was in the 3-6 bar range.

After about 12 hours, the pipe was raised, using carrying belts and a crane, onto a transport pallet, and was transported to a storage site without any damage.

After seven days, the pipe was destroyed using a heavy hammer, and the fragments were inspected. The fibers were uniformly distributed and the fracture faces did not show any cavities or defect sites, the fracture faces were not oriented in one specific direction, and the applied layers showed equally good connection to one another as within the same layer.

Inventive Example 2

Inventive example 1 was repeated, using 2.15 kg of Fibraflex fibers instead of the Kuralon™ fibers.

The fresh mortar had a slump of 305 mm, measured according to DIN EN 1015-3 after the raising of the slump cone without lifts of the flow table.

In this experiment, a nozzle 110 mm long and 12 mm wide was used instead of the circular nozzle.

Printing took place in an analogous manner to example 1, but to produce not a pipe but instead a wall of about 500 mm in height, about 600 mm in width and about 110 mm in thickness, in layers with a height in each case of about 15 mm. The fiber-containing mortar mixture was conveyed and printed without problems, and without instances of blockage or clogging.

After about 2 days, parts were broken out of the wall. The fracture edges showed no preferred direction; the contact areas between the layers were not preferential breakage points. The fibers were uniformly distributed, and the fracture faces exhibited hardly any cavities or defect sites.

Comparative Example 1

The experiment of inventive example 1 was repeated, but with a change to the construction of the dynamic continuous mixer. The stirring shaft was equipped with 92 pegs spaced apart by 9 mm, and the screw conveyor had 6 turns, with spacings thereof decreasing from 22 mm to 5 mm toward the outlet.

Under the same conditions as described in inventive example 1, printing was commenced, but had to be terminated after about 2 minutes owing to blockage of the mixer.

BRIEF DESCRIPTION OF THE DRAWINGS

Exemplary embodiments of the invention are elucidated in more detail below with reference to the drawing.

FIG. 1 shows: a schematic illustration of an exemplary mixer.

Only those elements essential to the direct understanding of the invention have been shown.

FIG. 1 illustrates an exemplary mixer 1. The mixer 1 has a drive 3 and a drum 2 with a mixing region 10 and a conveying region 11. In the mixing region there is a stirring shaft 4 and two inlets 6; in the conveying region 11 there is a conveying device 5 and an outlet 7.

In this case, the conveying device 5 is arranged directly adjoining the stirring shaft 4, such that the accelerated mineral binder composition mixed by the stirring shaft 4 can be captured directly by the conveying device 5 and can be conveyed out of the drum 2 through the outlet 7.

The conveying device 5 in this illustration is configured as a screw conveyor. The screw conveyor in this illustration has two complete turns. Depending on the desired conveying rate, the screw conveyor may have different dimensioning and/or a different configuration. The conveying device 5 and the stirring shaft 4 are arranged on one and the same axis in the drum 2. In this illustration, the stirring shaft 4 is equipped with pegs 8, so that the hydrous binder composition in the drum is moved by the pegs 8 on rotation of the stirring shaft.

In this illustration there are two inlets 6 arranged on the drum 2. In an alternative variant, not illustrated, however, the drum 2 has only one inlet. In that case, the components to be mixed may already be combined before they are conveyed via the inlet into the drum 2.

Preference is given to a mixer 1 for mixing the hydrous mineral binder composition with the aqueous accelerator, the mixing region 10 and the conveying region 11 being arranged in one and the same drum 2.

The stirring shaft 4 and the conveying device 5 are preferably arranged on one and the same axis.

The dynamic mixing element preferably comprises a stirring shaft 4 having stirring elements 8, the stirring elements 8 taking the form of pegs and a distance between adjacent stirring elements being at least 40%, preferably at least 60%, more preferably at least 80% of the length of the longest fibers. This is particularly advantageous for the mixing of the fibers, the mineral binder composition, and the aqueous accelerator.

The conveying device 5 takes the form preferably of a screw conveyor with turns, there being a distance 9 between adjacent turns of the screw conveyor that is at least 40%, preferably at least 60%, more preferably at least 80% of the length of the longest fibers.

This is especially advantageous for conveying the fiber-containing, accelerated, hydrous mineral binder composition.

It is advantageous, additionally, if the distance between the ends of the stirring elements 8 of the stirring shaft 4 and the inner wall of the drum 2 is at least the same size as the diameter of the largest particles of the filler.

It is particularly advantageous if the distances 9 between adjacent turns of the screw conveyor are of substantially the same size. The conveying device 5 preferably comprises two to four turns.

Such mixers are especially well suited to uniform and rapid mixing of the aqueous accelerator, the fibers, and the hydrous mineral binder composition, without the fibers forming lumps or leading to blockages.

The invention claimed is:

1. A method for applying a fiber-containing building material, comprising
providing a hydrous mineral binder composition, at least one aqueous accelerator for setting of the hydrous mineral binder composition, and fibers,
feeding the hydrous mineral binder composition; to a continuous mixer comprising
a drive,
a mixing region comprising at least one inlet and at least one dynamic mixing element and a conveying region connected to the mixing region and comprising at least one conveying device and an outlet, the hydrous mineral binder composition being conveyed through the at least one inlet into the mixing region, feeding the fibers into the mixing region of the continuous mixer, feeding the at least one aqueous accelerator into the mixing region of the continuous mixer, mixing the at least one aqueous accelerator with the hydrous mineral binder composition and the fibers in the mixing region of the continuous mixer to provide an accelerated fiber-containing mineral binder composition, conveying the accelerated fiber-containing mineral binder composition by means of the conveying device to the outlet, and applying the accelerated fiber-containing mineral binder composition, wherein the dynamic mixing element comprises a stirring shaft having stirring elements, the stirring elements taking the form of pegs, and a distance between adjacent stirring elements being at least 60% of the length of the longest fibers.

2. The method as claimed in claim 1, wherein the hydrous mineral binder composition comprises at least one hydraulic binder.

3. The method as claimed in claim 1, wherein the fibers are selected from the group consisting of metal fibers, mineral fibers, natural fibers, polymeric fibers, and mixtures thereof.

4. The method as claimed claim 1, wherein the fibers are flexible, having a flexural rigidity of not more than 20 N·mm$^2$, the flexural rigidity in the case of flat fibers being based on the flexural direction requiring the least force for flexure.

5. The method as claimed in claim 1, wherein the fibers
a) are round and have a length of 5 mm to 100 mm, and a diameter of 5 μm to 500 μm, or
b) are flat and have a length of 5 mm to 100 mm, a width of 5 μm to 2 mm, and a height of 5 μm to 300 μm.

6. The method as claimed in claim 1, wherein one cubic meter of the fiber-containing hydrous mineral binder composition contains 0.4 to 25 liters of fibers, calculated with the apparent density of the fibers.

7. The method as claimed in claim 1, wherein the fiber-containing hydrous mineral binder composition is a fresh mortar having a slump of at least 170 mm, determined according to DIN EN 1015-3 after the raising of the slump cone without lifts of the flow table.

8. The method as claimed in claim 1, wherein the aqueous accelerator comprises at least one compound selected from the group consisting of amino alcohols, alkali metal and alkaline earth metal nitrates, alkali metal and alkaline earth metal nitrites, alkali metal and alkaline earth metal thiocyanates, alkali metal and alkaline earth metal halides, alkali metal and alkaline earth metal carbonates, glycerol, glycerol derivatives, glycols, glycol derivatives, aluminum salts, aluminum hydroxides, alkali metal and alkaline earth metal hydroxides, alkali metal and alkaline earth metal silicates, alkali metal and alkaline earth metal oxides, crystallization nuclei, and mixtures thereof.

9. The method as claimed in claim 1, wherein the aqueous accelerator is metered in an amount in the range from 0.1 to 8 parts by weight, calculated as solid without water, based on 100 parts by weight of mineral binder.

10. The method as claimed in claim 1, wherein the continuous mixer is mounted on a movable printing head.

11. The method as claimed in claim 1, wherein the conveying device is a screw conveyor having turns, a distance between adjacent turns of the screw conveyor being at least 40% of the length of the longest fibers.

12. The method as claimed in claim 11, wherein the distances between adjacent turns of the screw conveyor are of substantially equal size and/or in that the conveying device comprises two to four turns.

13. The method as claimed in claim 1, wherein the fibers are provided in the hydrous mineral binder composition and/or in that the fibers are fed in the hydrous mineral binder composition to the mixer.

* * * * *